US007118135B2

(12) United States Patent
Tims et al.

(10) Patent No.: US 7,118,135 B2
(45) Date of Patent: Oct. 10, 2006

(54) EMBOSSED PAPER

(75) Inventors: J. Michael Tims, Kettering, OH (US); Catherine Ayres, Beavercreek, OH (US); Sandra L. Cashman, Springboro, OH (US)

(73) Assignee: MeadWestvaco Corporation, Glen Allen, VA (US)

( * ) Notice: Subject to any disclaimer, the term of this patent is extended or adjusted under 35 U.S.C. 154(b) by 73 days.

(21) Appl. No.: 10/360,084

(22) Filed: Feb. 7, 2003

(65) Prior Publication Data

US 2004/0155454 A1 Aug. 12, 2004

(51) Int. Cl.
*G09B 11/04* (2006.01)
*G09B 21/00* (2006.01)

(52) U.S. Cl. ........................ 283/117; 434/113; 434/117; 434/164; 434/112; 434/163; 434/85; 434/115; 434/166; 400/127; 283/45; 283/46; 283/115; 101/3.1

(58) Field of Classification Search ................ 283/117, 283/45, 46, 115; 434/112, 113, 117, 163, 434/164, 85, 115, 166; 35/37, 38; 400/127; 101/3.1
See application file for complete search history.

(56) References Cited

U.S. PATENT DOCUMENTS 1,371,430 A * 3/1921 Nickerson ................... 434/117
1,426,055 A * 8/1922 Fast ........................... 434/117
2,616,198 A * 11/1952 Sewell ........................ 264/320
3,015,267 A * 1/1962 Dashew ....................... 283/108
3,486,246 A * 12/1969 Johnson, Jr. ................ 434/425
3,512,273 A * 5/1970 Baker, Jr. et al. ........... 434/163
3,574,956 A * 4/1971 Hamelin ..................... 434/425
3,733,468 A * 5/1973 Eberly, Jr. .................. 235/487
3,816,943 A * 6/1974 Henry ......................... 434/117
3,869,813 A * 3/1975 Hancy ......................... 434/163
3,959,894 A * 6/1976 Hanson et al. .............. 434/117
4,035,652 A * 7/1977 Schroeder ................ 250/462.1
4,130,946 A * 12/1978 Coady ......................... 434/164
4,173,082 A 11/1979 Niquette
4,245,013 A * 1/1981 Clegg et al. ................ 429/144
4,268,256 A 5/1981 Moskowitz
4,552,536 A * 11/1985 Kay et al. ................... 434/327
4,626,219 A * 12/1986 Goldreyer ................... 434/162

(Continued)

FOREIGN PATENT DOCUMENTS

DE 3226758 A1 * 3/1983

(Continued)

OTHER PUBLICATIONS

Sheet described in Attachment A; date unknown. Applicants admit the status of this publication as prior art for the limited purpose of examination of this application and reserve the right to challenge the status of this publication as prior art.

(Continued)

*Primary Examiner*—Monica Carter
*Assistant Examiner*—Mark Henderson
(74) *Attorney, Agent, or Firm*—Thompson Hine LLP

(57) ABSTRACT

A sheet of embossed paper including a sheet-like body portion, at least one embossed or depressed line located on the body portion, and at least one printed line located on and extending at least partially along the embossed or depressed line. The invention may also include notebook including a plurality of sheets of paper, each sheet including a sheet-like body portion, at least one embossed or depressed line located on the body portion, and at least one printed line located on and extending at least partially along the embossed or depressed line. The notebook may include binding means binding the plurality of sheets together.

13 Claims, 3 Drawing Sheets

U.S. PATENT DOCUMENTS

| | | | | |
|---|---|---|---|---|
| 4,650,421 | A * | 3/1987 | Anczurowski | 434/113 |
| 4,735,516 | A * | 4/1988 | Galarneau | 400/109.1 |
| 4,859,094 | A * | 8/1989 | Okada | 400/109.1 |
| 4,865,547 | A * | 9/1989 | Glover | 434/85 |
| 4,988,126 | A * | 1/1991 | Heckenkamp et al. | 283/92 |
| 5,217,378 | A * | 6/1993 | Donovan | 434/116 |
| 5,232,535 | A | 8/1993 | Brinley | |
| 5,722,693 | A * | 3/1998 | Wicker | 283/67 |
| 6,302,696 | B1 | 10/2001 | O'Neill | |
| 6,459,364 | B1 * | 10/2002 | Gupta | 340/407.1 |
| 6,669,478 | B1 * | 12/2003 | Edwards et al. | 434/159 |
| 2002/0127519 | A1 * | 9/2002 | Bhatt et al. | 434/85 |

FOREIGN PATENT DOCUMENTS

GB 117420 * 7/1918

OTHER PUBLICATIONS

Sheet described in Attachment B; date unknown. Applicants admit the status of this publication as prior art for the limited purpose of examination of this application and reserve the right to challenge the status of this publication as prior art.

* cited by examiner

EMBOSSED PAPER

The present invention is directed to writing paper, and more particularly, to writing paper including at least one embossed line located thereon.

BACKGROUND

Writing paper is often used by school children and others to develop and refine their writing skills. The writing paper may include a plurality of lines located thereon to provide guides to the user. Furthermore, some writing paper may include embossed lines for guides to the user. However, such embossed writing paper may not include any written lines or other indicia located thereon to provide a visual guide or feedback to the user. Accordingly, there is a need for improved, embossed writing paper.

SUMMARY

In one embodiment, the present invention embossed paper including at least one embossed line and at least one printed line located at least partially thereon. In particular, in one embodiment the invention is a sheet of embossed paper including a sheet-like body portion, at least one embossed or depressed line located on the body portion, and at least one printed line located on and extending at least partially along the embossed or depressed line. In another embodiment, the invention is a notebook including a plurality of sheets of paper, each sheet including a sheet-like body portion, at least one embossed or depressed line located on the body portion, and at least one printed line located on and extending at least partially along the embossed or depressed line. The notebook may include binding means binding the plurality of sheets together.

Other objects and advantages of the present invention will be apparent from the following description and the accompanying drawings.

DETAILED DESCRIPTION

Figure 1:
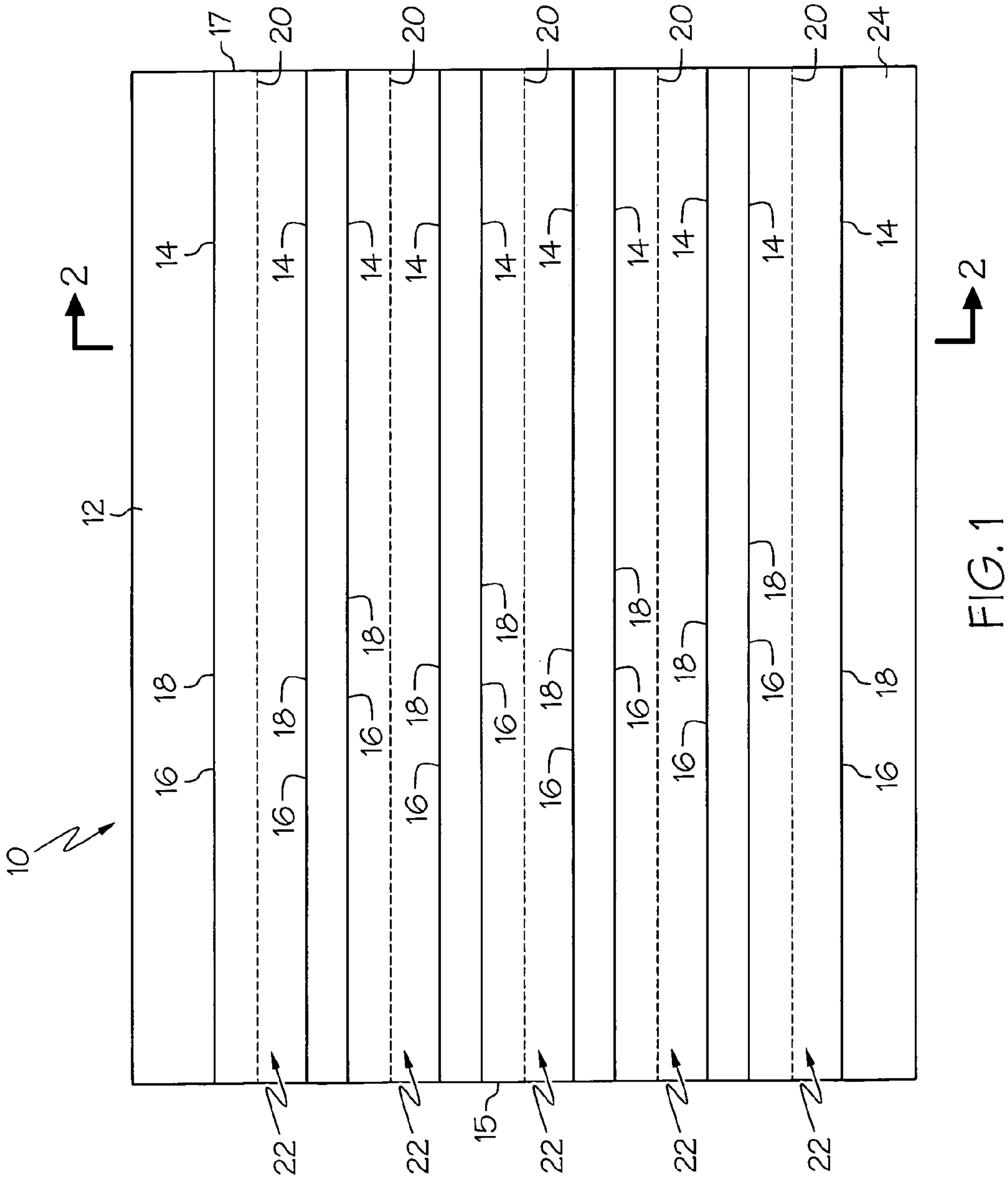
FIG. 1 is a top view of one embodiment of the paper of the present invention.

As shown in FIG. 1, the sheet 10 of the present invention may include a sheet-like body portion 12. The body portion 12 can be made from nearly any material which can be written upon, including but not limited to, plastics or fiber-based paper made from a cellulose-based fiber pulp, synthetic materials, or a blend of pulp and synthetic materials. The sheet 10 may include a plurality of generally straight, parallel guidelines 14 extending from one edge 15 of the sheet 10 to an opposite edge 17.

Figure 2:
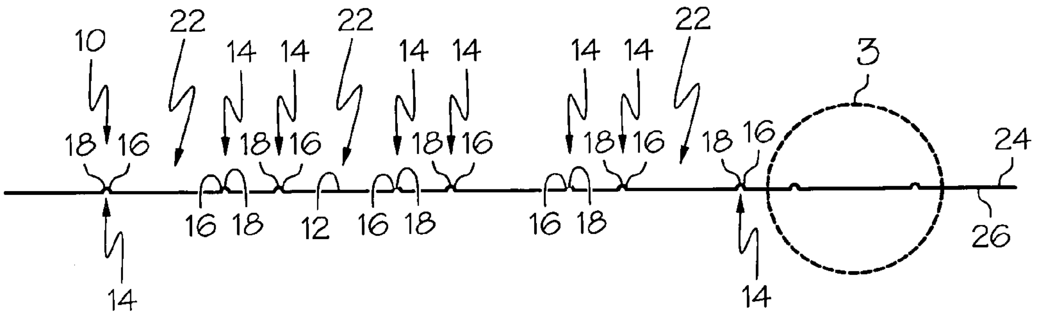
FIG. 2 is a side cross section take along line 2—2 of FIG. 1.
Figure 3:
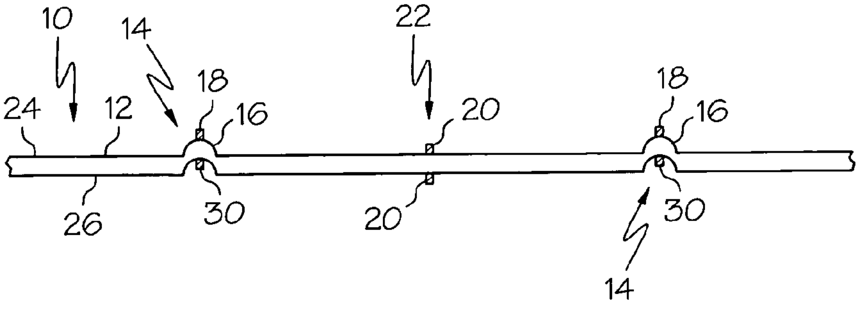
FIG. 3 is a detail view of area 3—3 of the sheet of FIG. 2.

As shown in FIGS. 2 and 3, each guideline 14 may include an embossed line 16 and a printed line 18 located on the embossed line 16. In other words, each guideline 14 may be formed by an embossed line 16, with a printed line 18 located on top of the embossed line 16. Each guideline 14 may extend from one edge 15 of the sheet 10 to the opposite edge 17, or may extend the majority of the width or length of the sheet 10, for example, at least about 50% of the length or width of the sheet 10, or at least about 90% of the length or width of the sheet 10. The embossed lines 16 may be created by a wide variety of methods utilizing nearly any embossing technique as are well known in the art, such as by passing the sheet under an embossing roll or wheel, or between the nip of a pair of embossing rolls, etc.

The guidelines 14 may be spaced apart a sufficient distance to define a writing area 22 therebetween. For example, adjacent ones of the guidelines 14 may be spaced apart by a distance of between about ¼" and about 2" to define a writing area 22 therebetween. The sheet 10 may include a plurality of intermediate lines 20, with each intermediate line 20 being located between an adjacent pair of guidelines 14 and in one of the writing areas 22. In the illustrated embodiment, each of the intermediate lines 20 is a printed dotted line located on a generally flat portion of the body portion 12 (that is, not on an embossed portion of the sheet 10).

Each embossed line 16 may include a bead that is raised relative to the front side 24 of the body portion 12 and depressed relative to the rear side 26 of the body portion. As shown in FIG. 3, the sheet 10 may include a printed line 18 located on the front side 24 of the sheet 10 and on each embossed line 16 (each printed line 18 being schematically illustrated in FIG. 3 by a dark rectangle).

Each embossed line 16 may also include a printed line 30 located on the rear side 26 and extending generally parallel thereto. Relative to the rear side 26 of the paper 10, each embossed line 16 may appear as a "debossed" line or a "line of depression." Thus, in this case each guideline 14 may include a debossed line with a printed line 30 located thereon. The rear side 26 of the sheet 10 may also include the intermediate guidelines 20 printed thereon. Accordingly, a top view of the rear side 26 of the sheet 10 may appear identical to the top view of the front side 24 of the sheet 10 shown in FIG. 1.

Each of the guidelines 14 may provide both a tactile and visual guide to the user, for example, when the user writes in the writing area 22. In particular, if the user's writing instrument engages or passes over a guideline 14, the resultant bump or area of depression can provide tactile feedback to the user. Furthermore, because each guideline 14 includes a printed line 18, 30, the user can also visually note when the writing or writing instrument has extended beyond the bounds of the writing area 22. Thus, the combination of the printed line 18, 30 and embossed or debossed line 16 of each guideline 14 can provide enhanced feedback so that a user can learn to stay in the writing area 22 to improve his or her writing skills.

Figure 4:
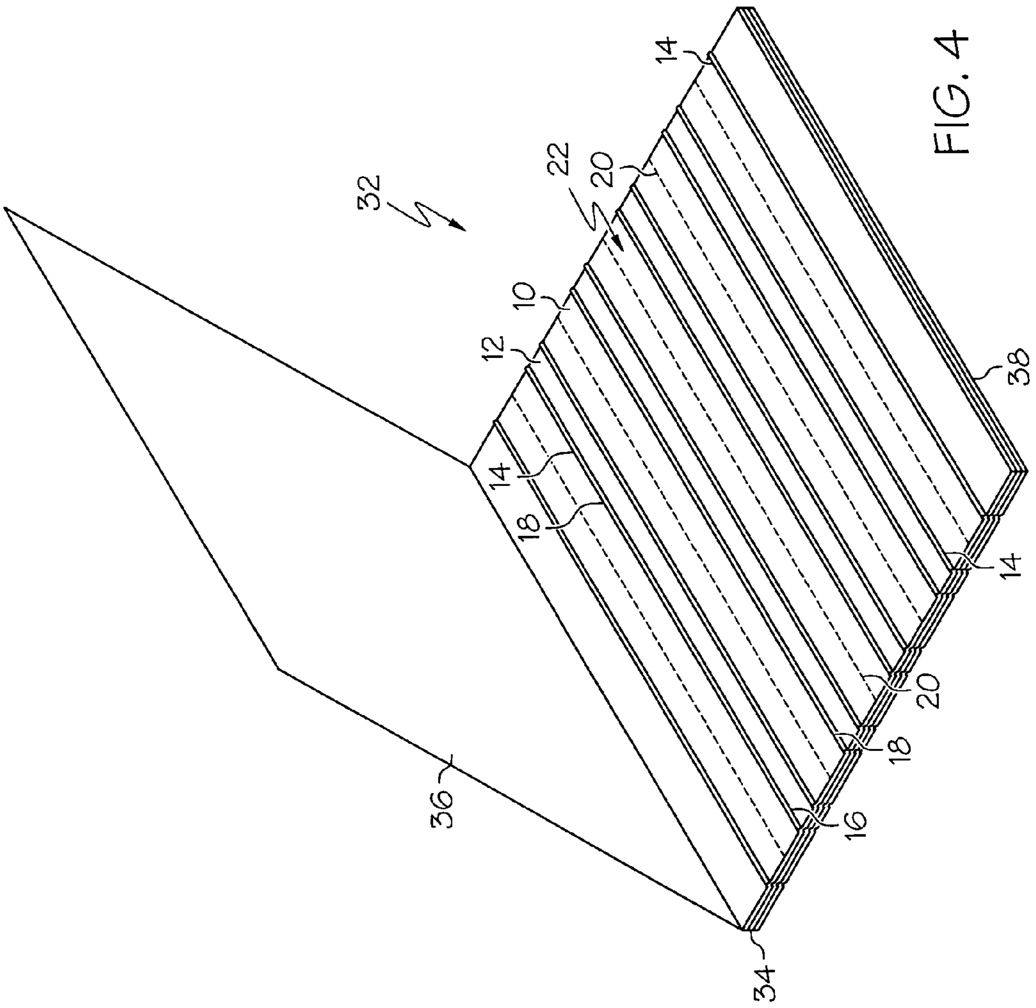
FIG. 4 is a front perspective view of a notebook of papers.

As shown in FIG. 4, a plurality of sheets 10 may be bound together by a binding mechanism 34 to form a notebook 32 having a front cover 36 and a rear cover 38. The front 36 and rear 38 covers may be made from a relatively stiff material, such as cardboard or plastics, to protect the sheets 10 and provide stiffness and structure to the notebook 32. In the illustrated embodiment the binding mechanism 34 is an adhesive binder, but the binding mechanism 34 can take any of a variety of forms including but not limited to clips, clasps, binder rings, spiral binder, staples, shrink-wrap or other packaging, etc.

Having described the invention in detail and by reference to the preferred embodiments, it will be apparent that modifications and variations thereof are possible without departing from the scope of the invention.

What is claimed is:

1. A sheet of embossed material comprising:

a sheet-like body portion of cellular based or pulp based material having an outer perimeter with at least a pair of opposed outer edges defining a dimension therebetween;

at least one preformed straight embossed or depressed line located on said body portion extending an entire distance of said dimension between said opposed outer edges, wherein said at least one embossed or depressed line is defined by a deformation of said body portion and includes a bead portion that is raised relative to one side of said body portion and depressed relative to the other side of said body portion;

at least one pre-printed straight line located on and extending at least partially along said preformed embossed or depressed line, said preformed embossed or depressed line and said pre-printed line being provided to guide the writing of a user on said body portion; and a back side pre-printed line located on said other side of said body portion on and along said embossed or depressed line.

2. The sheet of claim 1 wherein said at least one pre-printed line extends generally parallel to said embossed or depressed line.

3. The sheet of claim 1 wherein said body portion includes a plurality of preformed embossed or depressed lines located on said body portion and a plurality of pre-printed lines located on said body portion, wherein said plurality of preformed embossed or depressed lines and said plurality of pre-printed lines extend the entire distance of said dimension between said opposed outer edges.

4. The sheet of claim 1 wherein said body portion is generally rectangular.

5. The sheet of claim 1 wherein said at least one pre-printed line extends generally parallel to said embossed or depressed line, and wherein said sheet includes an auxiliary preformed embossed or depressed line extending generally parallel to said embossed or depressed line and an auxiliary pre-printed line located on and extending generally parallel to said auxiliary embossed or depressed line, wherein said embossed or depressed line and said auxiliary embossed or depressed line are spaced apart by a distance of between about ¼" and about 2" to define a writing area therebetween.

6. The sheet of claim 1 wherein said at least one pre-printed line is located on said embossed or depressed line for a majority of a length of said embossed or depressed line.

7. The sheet of claim 1 wherein said material is paper.

8. The sheet of claim 1 further comprising binding means binding said sheet to a plurality of other sheets.

9. The sheet of claim 1 wherein said at least one preformed embossed or depressed line is not formed by a user of said sheet of paper, and wherein said at least one pre-printed line is not formed by a user of said sheet of paper.

10. The sheet of claim 2 wherein said at least one pre-printed line extends the entire distance of said dimension between said opposed outer edges.

11. The sheet of claim 3 wherein each pre-printed line extends generally parallel to a corresponding preformed embossed or depressed line and is located on the corresponding embossed or depressed line.

12. The sheet of claim 5 further comprising a pre-printed guide line located between said embossed or depressed line and said auxiliary embossed or depressed line and extending generally parallel thereto, said pre-printed guide line not being located on an embossed or depressed line.

13. A sheet of embossed material comprising:

a sheet-like body portion of cellular based or pulp based material having an outer perimeter with at least a pair of opposed outer edges defining a dimension therebetween, said body portion having first and second opposed sides;

at least one embossed or depressed line located on said body portion and extending generally an entire distance of said dimension between said opposed outer edges;

a front side printed line located said first side of said body portion and extending at least partially along said embossed or depressed line; and a back side printed line located on said second side of said body portion and extending at least partially along said embossed or depressed line.

* * * * *